United States Patent [19]

Peaslee et al.

[11] Patent Number: 5,329,615
[45] Date of Patent: Jul. 12, 1994

[54] CONCURRENT GENERAL PURPOSE AND DMA PROCESSING IN A GRAPHICS RENDERING PROCESSOR

[75] Inventors: John M. Peaslee; Jeffrey C. Malacarne, both of Chino Hills, Calif.

[73] Assignee: Hughes Aircraft Company, Los Angeles, Calif.

[21] Appl. No.: 125,614

[22] Filed: Sep. 23, 1993

Related U.S. Application Data

[63] Continuation of Ser. No. 582,710, Sep. 14, 1990, abandoned.

[51] Int. Cl.$^5$ ............................................. G06F 15/20
[52] U.S. Cl. .................................. 395/162; 395/275; 395/375; 364/230.1; 364/230.2; 364/241.2
[58] Field of Search ................................. 395/162-166, 395/250, 375, 325, 425, 500, 275, 158, 700; 364/200 MS File, 900 MS File

[56] References Cited

U.S. PATENT DOCUMENTS

| | | | |
|---|---|---|---|
| 3,962,682 | 6/1976 | Caudel | 395/325 |
| 4,398,244 | 8/1983 | Chu et al. | 395/375 |
| 4,430,707 | 2/1984 | Kim | 395/375 |
| 4,811,205 | 3/1989 | Normington et al. | 395/164 |
| 4,858,107 | 8/1989 | Fedele | 395/164 |
| 4,862,392 | 8/1989 | Steiner | 395/127 |
| 4,916,301 | 4/1990 | Mansfield et al. | 395/163 |
| 4,928,247 | 5/1990 | Doyle et al. | 395/160 |
| 4,958,303 | 9/1990 | Assarpour et al. | 395/164 |
| 5,010,515 | 4/1991 | Torborg, Jr. | 395/250 |
| 5,138,702 | 8/1992 | Tada | 395/162 |

*Primary Examiner*—Dale M. Shaw
*Assistant Examiner*—Kee M. Tung
*Attorney, Agent, or Firm*—W. K. Denson-Low

[57] ABSTRACT

A graphics processor that implements general purpose graphics processing and concurrent DMA display list processing to provide rapid response to display tasks. It is implemented with multiple channels of FIFO input circuits and with task interrupt and context switching circuits. Concurrent with a host processor that constructs and downloads a display list, the graphics processor processes display list instructions as they are downloaded. This reduces latency of the displayed image and facilitates more efficient use of the graphics processor. Implementation of multi-level nested interrupts and nested subroutines by means of interrupt and subroutine circuits further enhances graphics processing capability and enhances response times. Implementation of multiple channels with context switching enhances response times by permitting a higher priority task to interrupt a lower priority task.

9 Claims, 6 Drawing Sheets

CONCURRENT GENERAL PURPOSE AND DMA PROCESSING IN A GRAPHICS RENDERING PROCESSOR

This is a continuation of application Ser. No. 582,710, filed Sep. 14, 1990, now abandoned.

CROSS REFERENCE TO RELATED APPLICATIONS

The present application is related to contemporaneously filed patent applications: Ser. No. 07/582,697 filed on Sep. 14, 1990, now U.S. Pat. No. 5,276,798, entitled, "Multifunction High Performance Graphics Rendering Processor," Ser. No. 07/582,696 filed on Sep. 14, 1990, now U.S. Pat. No. 5,255,360 entitled "Dual Programmable Block Texturing and Complex Clipping in a Graphics Processor," Ser. No. 07/582,728 filed on Sep. 14, 1990, entitled "Integrated Area Fill, Conics and Vector Generator in a Graphics Processor", Ser. No. 07/582,694 filed on Sep. 14, 1990, now U.S. Pat. No. 5,218,674, entitled "Hardware Bit Block Transfer Processor," Ser. No. 07/582,693 filed on Sep. 14, 1990, entitled "Hardware Symbology and Text Generator in a Graphics Processor," and Ser. No. 07/582,695 filed on Sep. 14, 1990, U.S. Pat. No. 5,265,203, entitled "Multiprocess Scheduler in a Graphics Processor," Ser. No. 07/582,709 filed on Sep. 14, 1990, now abandoned, entitled "Dual Hardware Channels and Hardware Context Switching in a Graphics Rendering Processor," all by John M. Peaslee and Jeffrey C. Malacarne, whose teachings are incorporated herein by reference.

BACKGROUND

The field of the invention is display systems and in particular graphics processors for display systems that concurrently implement general purpose and DMA processing operations.

Graphics display systems are often implemented with a host processor building and downloading a display list of instructions to a special purpose graphics processor. The graphics processor processes the display list with special purpose instruction processing capability after a complete display list has been downloaded. The time required for the host processor to build and download the display list is often significant compared to the response time requirements. Hence, excessive delays in system response often occur. Also, the graphics processor is often executing a lower priority task while a higher priority task is awaiting processing. Also, the special purpose nature of the graphics processor causes programming inefficiencies and additional delays in system response. Current graphics processors do have some form of general purpose capability. However, it is typically thought that much of the general purpose capability available with micro processors, such as multi-level nested interrupts and nested subroutines, are not appropriate for graphics processors.

It is the standard in the graphics processing industry to completely construct the display list first. Then the display list is processed. In essence, the tasks are performed sequentially. Accordingly, a concurrent graphics processor implemented with DMA downloading would solve the important graphic system problem of fast response.

SUMMARY OF THE INVENTION

The present invention is an improvement in graphics processors, implementing general purpose graphics processing capability and implementing concurrent DMA display list processing to provide rapid response to display tasks. Concurrent with the host processor constructing and downloading a display list, the graphics processor processes the display list instructions as they are downloaded. This reduces latency of the image being displayed and facilitates more efficient use of the graphics processor. Implementation of multi-level nested interrupts and nested subroutines further enhances graphics processing capability and enhances response times. Implementation of multiple channels with context switching still further enhances response times by permitting a higher priority task to interrupt a lower priority task.

A preferred embodiment of a concurrent DMA general purpose graphics processor system comprises one or more stored program computers for generating display lists each having a plurality of graphic instructions and a graphics cogenerator coupled to the stored program computer for generating graphic pixel signals in response to the graphic instructions in the display list. The graphics cogenerator includes a concurrent DMA processing circuit for processing the instructions in the display list concurrently with the generation of the display list by the stored program computer, a bit map memory coupled to the graphics cogenerator for storing the graphic pixel signals, and a display monitor coupled to the bit map memory for generating a display in response to the graphic pixel signals stored by the bit map memory.

The graphics cogenerator may include an interrupt input circuit for generating an interrupt signal and an interrupt execution circuit coupled to the interrupt input circuit for interrupting the generation of graphic pixel signals by the graphics cogenerator in response to the interrupt signal. It may also include a nested subroutine circuit for concurrently processing the instructions in the display list as nested subroutines.

The graphics cogenerator may also may include an interrupt input circuit for generating an interrupt signal, an interrupt execution circuit coupled to the interrupt input circuit and to the plurality of FIFOs for interrupting the generating of graphic pixel signals in response to the interrupt signal and in response to a first display list stored by the plurality of FIFOs and for generating graphic pixel signals in response to the interrupt signal and in response to a second display list stored by the plurality of FIFOs.

The graphics cogenerator may also include a context memory coupled to the interrupt input circuit for storing the context of the first display list in response to the interrupt signal. The graphics cogenerator may also include an interrupt input circuit for generating an interrupt signal, a nested interrupt execution circuit coupled to the interrupt input circuit and to the stored program computer for interrupting the generating of graphic pixel signals in response to the interrupt signal and for generating the graphic pixel signals in response to the interrupt signal, and a push down stack coupled to the interrupt input circuit for storing a plurality of return addresses related to nested interrupts.

The graphics cogenerator may also include a nested subroutine execution circuit for generating the graphic pixel signals under control of a nested subroutine instruction and a push down stack coupled to the nested subroutine execution circuit for storing a plurality of return addresses related to nested subroutines.

The graphics cogenerator may also include an interrupt input circuit for generating an interrupt signal, a nested interrupt execution circuit coupled to the interrupt input circuit for interrupting the generating of graphic pixel signals in response to the interrupt signal and for generating the graphic pixel signals in response to the interrupt signal, a push down stack coupled to the interrupt input circuit for storing a plurality of return addresses related to nested interrupts, a restore control circuit coupled to the nested interrupt execution circuit for generating a plurality of nested restore signals in response to the graphic instructions in the display list, and a restore execution circuit coupled to the restore control circuit and to the push down stack for restoring the return addresses in response to plurality of nested restore signals.

The graphics cogenerator may also include a nested subroutine execution circuit for generating the graphic pixel signals in response to a nested subroutine instruction, a push down stack for storing a plurality of return addresses related to nested subroutines, a restore control circuit coupled to the nested subroutine execution circuit for generating a plurality of nested restore signals in response to the graphic instructions in the display list, and a restore execution circuit coupled to the restore control circuit and to the push down stack for restoring the return addresses in response to plurality of nested restore signals.

Accordingly, a feature of the present invention is to provide an improved display system and method. Another feature of the present invention is to provide an improved graphics processor. Another feature of the present invention is to provide a general purpose graphics processor. Another feature of the present invention is to provide a multi-level nested interrupt capability for a graphics processor. Another feature of the present invention is to provide a nested subroutine capability for a graphics processor. Another feature of the present invention is to improve response time of a graphics processor. Another feature of the present invention is to reduce latency time of a graphics processor. Another feature of the present invention is to provide concurrent downloading and graphics processing. Another feature of the present invention is to provide DMA downloading of display lists. Another feature of the present invention is to provide a multiple channel graphics processor. Another feature of the present invention is to provide a multiple channel FIFO input for a graphics processor. Another feature of the present invention is a context switching interrupt structure to facilitate higher priority processing.

BRIEF DESCRIPTION OF THE DRAWINGS

The various features and advantages of the present invention will become apparent from the following detailed description taken in conjunction with the accompanying drawings, wherein like references numerals designate like structural elements, and in which.

DETAILED DESCRIPTION

Figure 1:
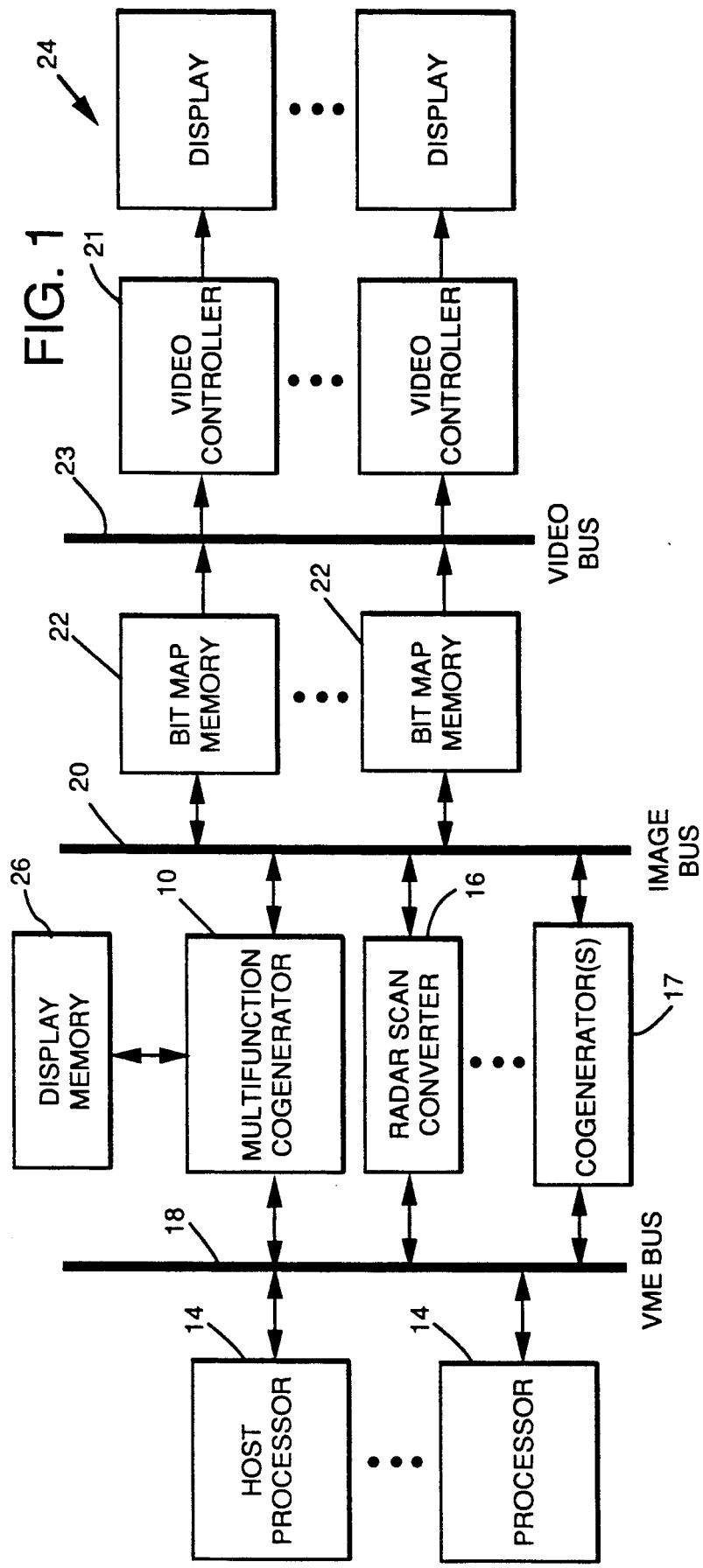
FIG. 1 is a block diagram representation of a graphics cogenerator system in accordance with the principles of the present invention.
Figure 2:
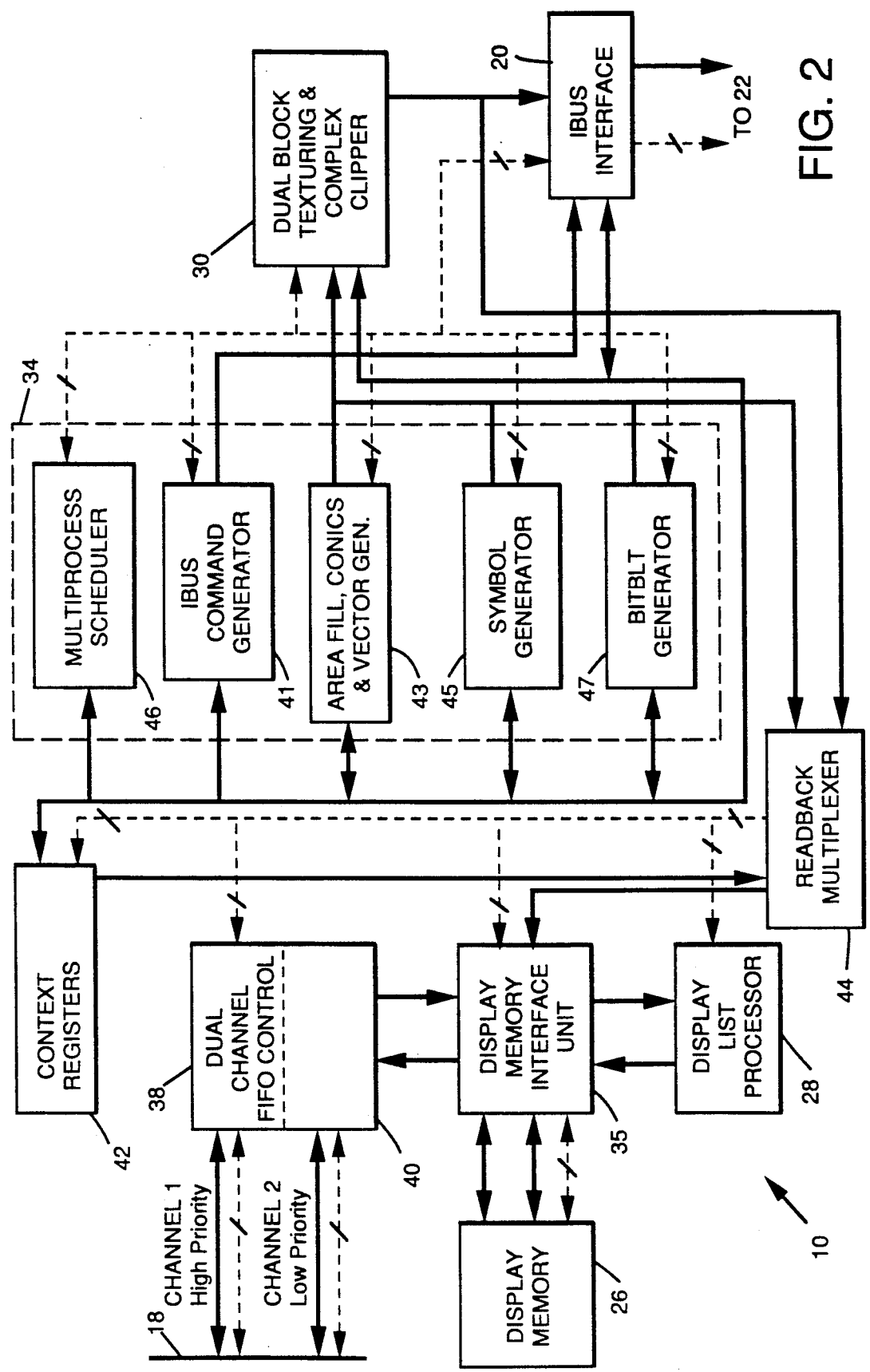
FIG. 2 is a block diagram representation of a graphics cogenerator in accordance with the principles of the present invention.

Referring to the drawings, FIG. 1 is a block diagram of a generalized graphic display system including a dual channel multifunction cogenerator 10 of which the present invention forms a part. FIG. 2 shows a block diagram of the cogenerator 10 of which a dual channel FIFO controller 38, 40 and context registers 42 of the present invention forms a functionally distinct part. The cogenerator 10 is a dual channel, hardware based device which operates in conjunction with one or more general purpose data processing systems, such as a military command and control system, wherein the simplified system is shown in FIG. 1. Briefly, the system comprises one or more real time data processors 14 and other real time data accumulating devices such as a radar system 16 and other cogenerators 17. The host processor 14 and the radar scan converter 16, for example, feed data into the cogenerator 10 via a multifunction bus 18 where it is combined with graphics data generated by the cogenerator 10. The cogenerator 10 outputs a complete set of data for generation of a graphics display via a 64-bit bidirectional interconnect image bus 20 into a bit map memory 22 and then by way of a video bus 23 and video controller to a display system 24. The cogenerator 10 may include various other input devices such as manual input output devices, multiple real time processors, bulk memory devices and the like.

A detailed description of the cogenerator 10 is given in copending commonly assigned U.S. patent application Ser. No. 07/582,697 now U.S. Pat. No. 5,276,798 entitled, "Multifunction Cogenerator," the teachings of which are incorporated herein by reference. In overview, however, the cogenerator 10 is a high performance single chip graphics rendering processor. It generates multiple graphics primitives and performs general purpose processing functions. The cogenerator accepts graphic commands over a thirty-two bit bidirectional host input port from a processor such as the host processor 14 of FIG. 1. The cogenerator 10 processes these commands and then draws into the bit mapped memory 22. The cogenerator 10 "draws" into the bit mapped memory 22 over the image bus 20. "Drawing" is performed by entering binary one and zero signals (drawing ones and drawing zeros herein) into individual memory locations of the bit mapped memory 22. Typically, the bit mapped memory 22 has multiple memory layers with the layers corresponding to color and intensity of graphic display pixels. The image bus 20 is a 64 bit bidirectional multi-user bus. The cogenerator 10 can draw graphic primitives such as symbols, polylines, rectangles, circles, ellipses, arcs, polygon fills, and perform bit block transfers (BITBLT) between the cogenerator 10, the host processor 14, and the bit mapped memory 22.

Directly associated with the cogenerator 10 is a triported display memory 26. The display memory 26 stores all commands and parameters and includes appropriate logic required for the cogenerator 10 to function properly. The memory address space in a working embodiment is 4 megabytes by 32 bits. The cogenerator 10 interfaces with either DRAMS, SRAMS, and/or PROMS. The display memory 26 is accessible by the cogenerator 10 display list processor 28, the cogenerator 10 internal graphics generator 30, and the host processor 14. Stored in the display memory 26 are two first in, first out (FIFO) memory buffers one of the buffers being assigned a higher operational priority than the other and there being one buffer memory for each of two drawing channels. An address stack is provided for each FIFO buffer to store subroutines calls. An attribute stack stores all internal cogenerator attributes for hardware context switching, a sin/cosine table for drawing graphics, and up to 128 font tables to draw stroked and/or dot matrix symbols and characters. A large display list region is also provided.

The display memory 26 is comprised of up to four million words of RAM organized as 32 bit data words and appropriate buffer logic. The contents of the display memory 26 may be organized as shown in Table I below. The host processor 14 has the ability to perform random reads and writes at any address within the display memory 26 address space. The cogenerator 10 monitors the input of data from the host processor 14 to the display memory 26 to synchronize updating of data from the host processor 14 with the output of graphics signals therefrom.

A dual channel FIFO buffer controller 38, 40 interfaces the cogenerator 10 to the host processor 14. The FIFO buffer controller 38, 40 are responsible for performing all interfacing duties such as proper "hand shaking" when the bus 18 is performing data transfers. The host processor 14 is able to both read and write to the cogenerator 10 and the display memory 26. When the host processor 14 reads or writes to the display memory 26, the FIFO buffer controller 38, 40 actually perform the read or write operations to the display memory 26 for the host processor 14. An address stack is provided internally within each FIFO buffer controller 38, 40 to store subroutine calls, an attributes stack to store all internal attributes required by the cogenerator 10 to perform hardware context switching, a sine/cosine table of drawing conics and primitives, up to 128 font tables to draw both stroked and dot matrix symbols and characters and a large display list region. The FIFO buffer controller 38, 40 is also responsible for arbitrating high and low priority channels to the cogenerator 10.

A display memory interface unit 35 performs the actual display memory 26 memory cycles. It is essentially a tri-port memory controller. The display memory 26 is used by both the host processor 14, and the cogenerator 10.

A display list processor 28 performs all of the cogenerator 10 command and display list processing. Commands are sent to the cogenerator 10 from the host processor 14. The display list processor 28 handles the various ways that commands can be sent to the cogenerator 10. The display list processor 28 interfaces to the display memory 26 using the display memory interface unit 35, reads commands from the FIFO buffers as well as performs other functions. When a command is given to the display list processor 28, the display list processor 28 processes the command and determines what action to take. The cogenerator 10 provides many different commands and sequences. A more detailed description of the display list processor is given in copending commonly assigned U.S. patent application Ser. No. 07/582,709 entitled Dual Hardware Channels and Hardware Context Switching in a Graphics Rendering Processor," now abandoned the teachings of which are incorporated herein by reference.

Context registers 42 store all of the cogenerator attributes. These attributes define the current state of the cogenerator 10. The current state may include a large number of parameters such as: cogenerator operational mode; draw pointer position; foreground color; background color; clipping window dimensions; etc. The contents of the cogenerator 10 are important as they define the personality of the cogenerator 10 at any given time and all attributes are user programmable. This gives a user considerable flexibility in operating the display system.

Also provided is a readback multiplexer 44 which is a large data multiplexer. It is used to multiplex data to the display memory interface unit 35 which is directed to either the display memory 26 or back to the host processor 14 via bus 18. Three sources of readback data are the context registers 42, a graphics generator 34 defined within the dashed block in FIG. 2, and the block texturing and complex clipping processor 30. If the data is intended for the host processor 14 it will be sent through the FIFO buffer controller 38, 40 by the display memory interface unit 35. The graphics generator 34 is connected to the readback multiplexer 44 for various cogenerator 10 drawing operations. The block texturing and complex clipping processor 30 also sends data to the readback multiplexer 44 for various cogenerator 10 operations.

The graphics generator 34 generates all of the cogenerator 10 primitives and symbols and performs bit block transfers (BITBLTs). The graphics generator 34 includes a multiprocess scheduler 46, a command generator 41, an area fill conic and vector generator 43, a symbol generator 45, and a BITBLT address generator 47. The area fill, conics and vector generator 43 creates digital signals representing graphics primitives such as polylines, rectangles, circles, ellipses and polygons and area fills. These primitive signals are next combined with other digital signals representing alphanumeric and other symbols, which are generated in a symbol generator 45, and with yet a third set of signals generated by block texturing and complex clipping processor 30 to produce the final set of signals which is then transferred by the BITBLT address generator 47 into specified pixel addresses in the bit mapped memory 22. Typically, the bit mapped memory 22 has multiple memory layers which set the color and intensity for the graphics display defined for each pixel location therein.

The multiprocess scheduler 46 controls data transfers between elements of the cogenerator 10. The multiprocess scheduler 46 uses a branched scheduler approach to control the several operations and apply certain characteristics of a software operating system thereto. This promotes functional independence between various cogenerator 10 sequences and provides a mechanism for inter-unit communication.

The area fill, conic and vector generator 43 calculates mathematical solutions for drawing geometric primitives. The symbol generator 45 generates alpha numeric symbols. The BITBLT address generator 47 provides a general purpose mechanism for moving rectangular blocks of image data in the bit map memory 22 and the display memory 26.

Detailed descriptions of the above-described devices are given in copending commonly assigned U.S. patent applications Ser. No. 07/582,728 entitled "Integrated Area Fill, Conics and Vector Generator in a Graphics Processor", Ser. No. 07/582,694 now U.S. Pat. No. 5,218,674, entitled "Hardware Bit Block Transfer Processor", Ser. No. 07/582,693 entitled "Hardware Symbology and Text Generator in a Graphics Processor", and Ser. No. 07/582,695 now U.S. Pat. No. 5,265,203, entitled "Multiprocess Scheduler in a Graphics Processor," the teachings of which are incorporated herein by reference.

Figure 3:
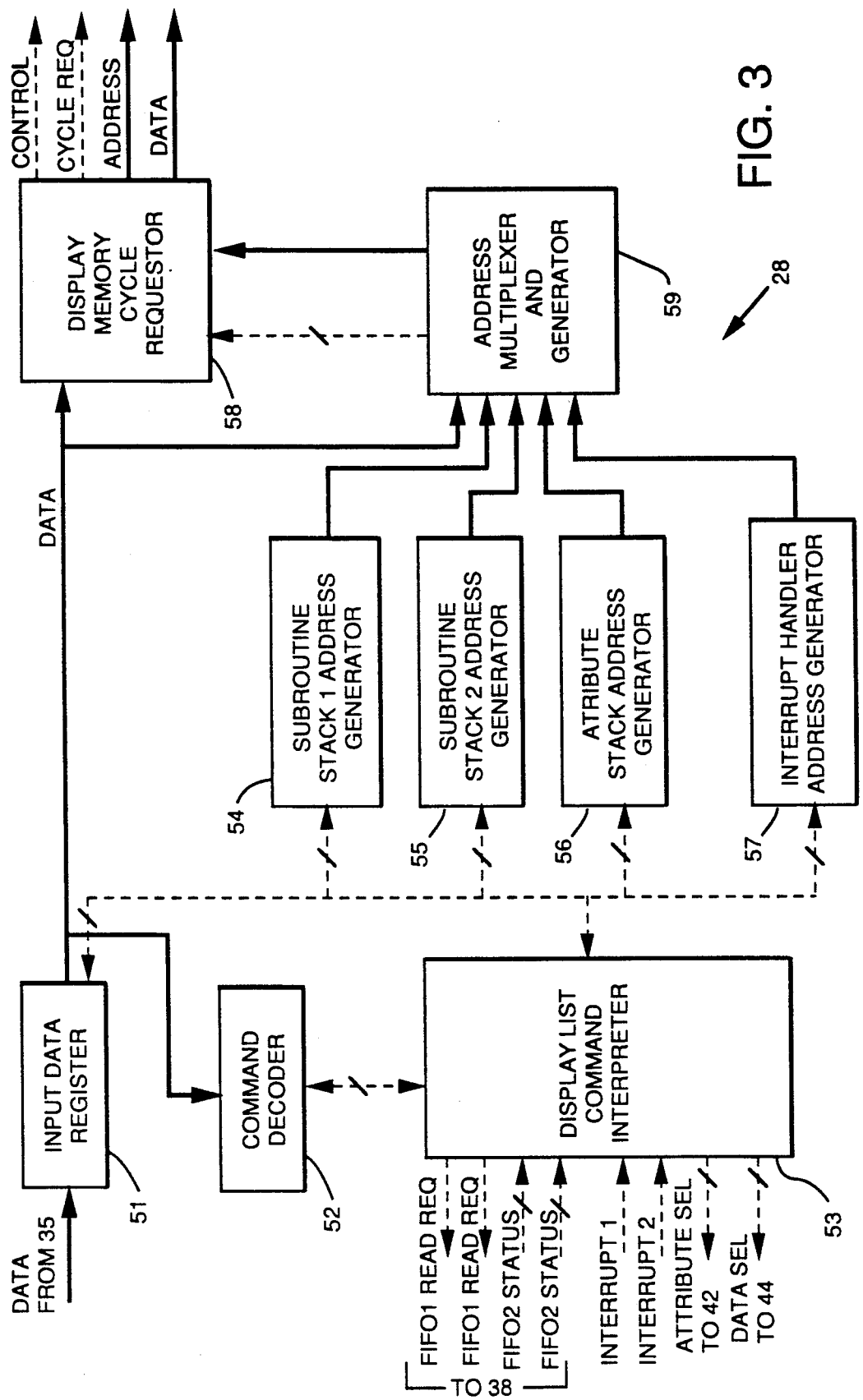
FIG. 3 is a block diagram of the display list processor in accordance with the present invention.

Referring to FIG. 3, a block diagram of the display list processor 28 of the present invention is shown. The display list processor 28 comprises an input data register 51 that is coupled to a command decoder 52 a display memory cycle register 58 and an address multiplexer and generator 59 for coupling of data thereto. The input data register 58 also has control lines coupled to the command decoder 52, a display list command interpreter 53, first and second subroutine stack address generators 54, 55 an attribute stack address generator 56, an interrupt handler address generator 57, the display memory cycle requestor 58 and the address multiplexer and generator 59. The display list command interpreter 53 is coupled to the FIFO controller 38, 40 by way of FIFO read request and status lines, coupled to external computers, such as the host processor 14 by way of interrupt lines, and to the context register 42 and readback multiplexer 44 by way of attribute and data select lines. The data memory cycle register 58 is coupled to the display memory interface unit 35 which in turn is coupled to the display memory 26. The operation of the display list processor 28 is described in more detail below with reference to Table I, and FIGS. 4–6.

The display list command interpreter 53 provides the functions of a concurrent processing circuit, an interrupt input circuit, and a restore control circuit. The interrupt handler address generator 57 provides the functions of an interrupt input circuit, a nested interrupt input circuit, a restore execution circuit, and a multi-level nested interrupt circuit. The first and second subroutine stack address generators 54, 55 function as nested subroutine circuit and push down stacks. The operation of these circuits is discussed in more detail below.

Referring now to Table I below, a memory map of the display memory 26 shows the locations and capacities of the stored information. The term K, as in 1K, means thousands of words of memory and the term M, as in 4M, means millions of words of memory. Memory addresses and memory capacities more than 1K words are often shown herein as being rounded off for convenience of discussion. However, in a preferred embodiment, the rounded off numbers are implemented with binary numbers. For example, 1K implies 1024 and 4K implies 4096.

An unused set of 8 words located at the bottom of the display memory 26 (words 0 to 7) are reserved for future use. An interrupt table having 247 words (words 8 to 255) is located above the unused 8 words at the bottom of the display memory 26 and is used to store interrupt vectors. A pair of subroutine stacks, subroutine stacks 1 and 2, having 256 words (words 256 to 511) and 512 words (words 512 to 1K), respectively, are located above the interrupt table near the bottom of the stack are used to store the return addresses from subroutine calls. Subroutine stack 1 stores return addresses for subroutine calls from channel 1 and subroutine stack 2 stores return addresses for subroutine call from channel 2. A pair of FIFOs, the higher priority FIFO (FIFO 1) and the lower priority FIFO (FIFO 2) having 1K words (words 1K to 2K) and 4K words (words 2K to 6K), respectively, are located above the subroutine stacks. These FIFOs are used to store the input display lists and individual command packets from the host processor 14. An attribute stack having 1K words (words 6K to 7K) is located above the FIFOs and is used to store attributes for context switching. A sine/cosine table having 1K words (words 7K to 8K) is located above the attribute stack and is used for conics rendering. Font tables, 128 tables each having 4K words totaling 512K words (words 8K to 520K), is located above the sine/cosine tables and is used for symbols and text rendering. A display list memory having 3.5M words (words 520K to 4M) is located above the font tables at the top of the display memory 26.

TABLE I

| MEMORY ADDRESS | DATE TYPE |
|---|---|
| 4M } | DISPLAY LIST |
| 520K } | FONT TABLE |
| 8K } | SINE/COSINE TABLE |
| 7K } | ATTRIBUTE STACK |
| 6K } | FIFO 2 |
| 2K } | FIFO 1 |
| 1K } | SUBROUTINE STACK 2 |
| 512 } | SUBROUTINE STACK 1 |
| 256 } | INTERRUPT TABLE |
| 8 } | UNUSED |
| 0 } | |

Figure 4:
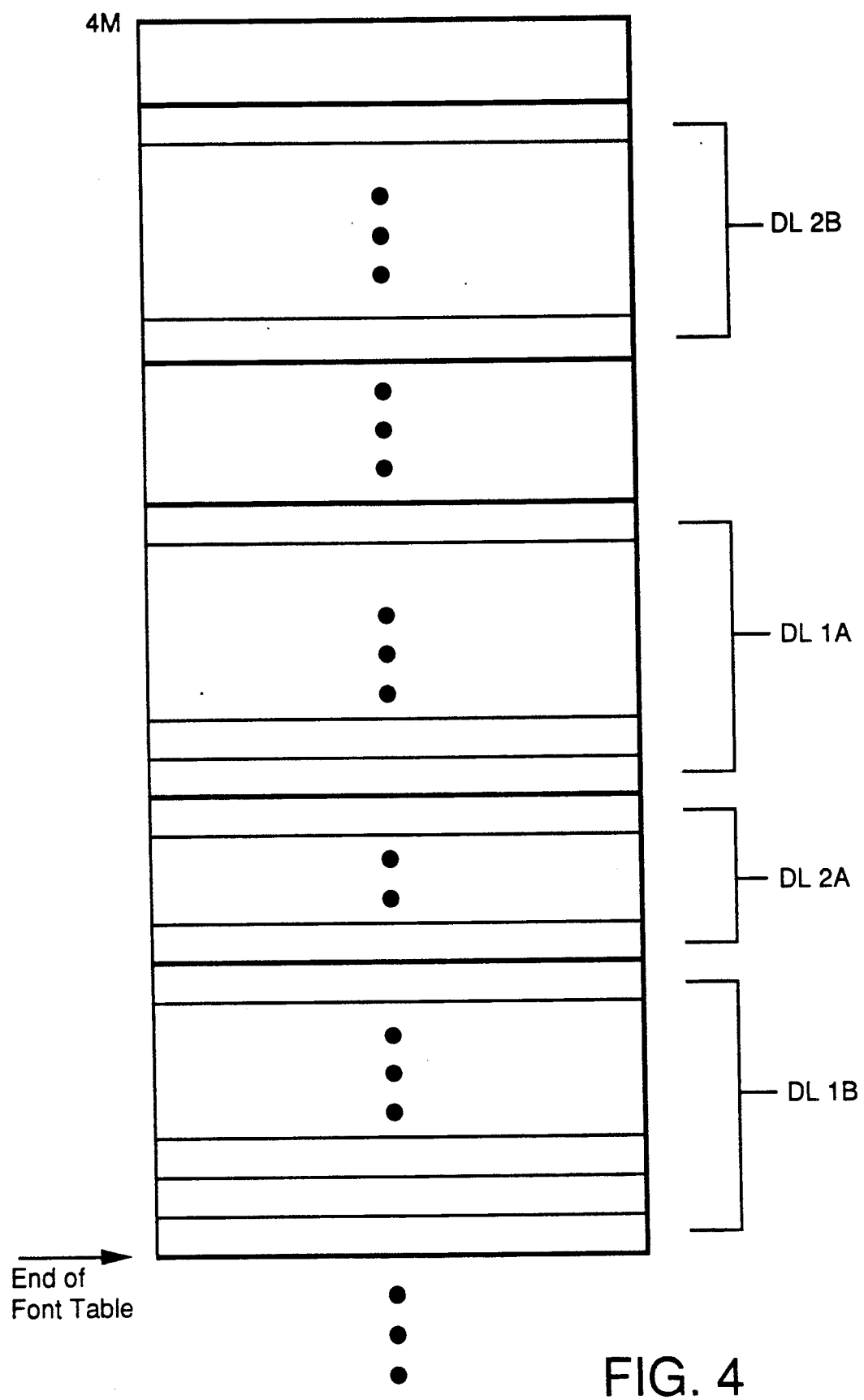
FIG. 4 is a memory map representation of the display list region of the display memory having multiple display lists.

Referring now to FIG. 4, the display list region in the display memory 26 is shown in greater detail having a plurality of display lists stored therein. For example, FIG. 4 shows display lists DL1A, DL1B, DL2A, and DL2B stored in the display list region. Display lists DL1A and DL1B are communicated through the channel 1 FIFO and display lists DL2A and DL2B are communicated through the channel 2 FIFO. The host processor 14 keeps track of the display list region and selects the start address in the display list region where each display list will be loaded.

Figure 5:
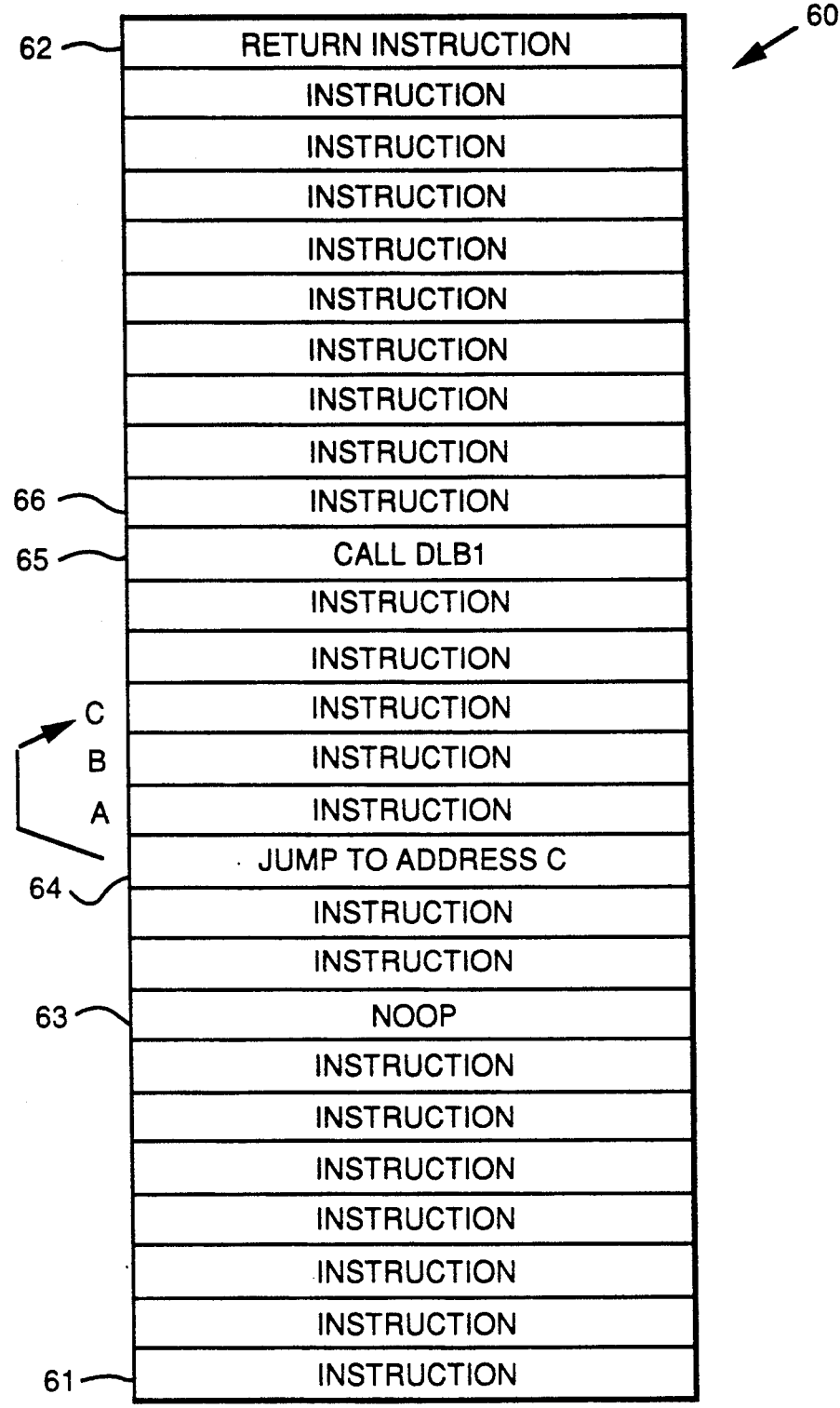
FIG. 5 is a memory map representation of a single display list showing instruction execution.

Referring now to FIG. 5, general purpose processing of a display list 60 is illustrated. A sequence of instructions is executed from the start address 61 to the last address 62. Processing of the display list may be initiated by a subroutine call, by an interrupt vector, or by a jump to the display list start address. The last instruction at the last address 62 is usually a RETURN instruction for a subroutine and a JUMP instruction for a non-subroutine display list. A NOOP instruction 63 is ignored by the graphics cogenerator 10. A JUMP instruction to address C 64 jumps over addresses A and B to execute the instruction at address C. A CALL DL1B instruction 65 initiates processing of display list DL1B, which ends in a RETURN instruction. Hence, after display list DL1B has been executed, operation returns to display list DL1A at the return address 66 following the CALL instruction.

The graphics cogenerator 10 has a general purpose processing capability, which is similar to the implementation of conventional micro processors and which is augmented with special features that facilitate rapid response and graphics processing. The general purpose processing capability is implemented with a display list having graphics instructions which are executed similar to execution of a stored program in a micro processor. The display list has multi-level nested interrupts, nested subroutines, jump instructions, and a set of display related instructions implemented in a conventional manner.

A display list is executed out of the display list region of the display memory 26 or out of a FIFO implemented in the display memory 26. Start of execution is invoked by a jump to the display list start address, by a subroutine call to the display list start address, or by an interrupt that is vectored to the display list start address. Completion of execution is invoked by a jump to the next display list start address, by a subroutine return to the display list start address, or by an interrupt return to the display list start address, respectively.

Various interrupt configurations are implemented in the graphics cogenerator 10. An interrupt is invoked under control of an interrupt instruction from the host processor 14 or under control of an external interrupt signal. The host processor 14 may generate an external interrupt which is vectored to the high priority FIFO for the display list to be executed. The interrupt circuitry is implemented similar to Motorola 68HC11 interrupt circuitry, where the data storm by the 68HC11 registers is pushed into the stack in the RAM in response to an interrupt and is popped out of the stack in the RAM in response to a RETURN instruction at the end of the interrupt routine. The 68HC11 interrupt is invoked under control of a SOFTWARE INTERRUPT instruction or under control of an external interrupt signal.

Interrupts are generated in response to external signals or in response to programmed interrupt instructions and subroutines are invoked in response to subroutine call instructions. Separate push down stacks with dedicated pointers are implemented in the display memory 26 to preserve contents of the registers in response to an interrupt and to store the return address in response to an interrupt or a subroutine call. This facilitates multi-level nested interrupts and subroutines with nesting capability. Interrupt operation is further discussed in the related patent application entitled "Multifunction High Performance Graphics Rendering Processor."

Interrupts are executed by storing the registers and the return address in a push down stack in the display memory 26, then looking up the appropriate interrupt vector in the display memory 26, then executing an interrupt routine identified by the vector, then returning to the interrupted display list routine in response to a return instruction at the end of the display list interrupt routine, then restoring the registers from the push down stack, and lastly continuing with execution of the interrupted display list routine. Subroutines are executed by storing the return address in a push down stack in the display memory 26, then executing the called subroutine stored in the display list region of the display memory 26, then returning to the calling display list in response to a return instruction at the end of the display list subroutine, and lastly continuing with execution of the display list routine that called the subroutine.

Figure 6:
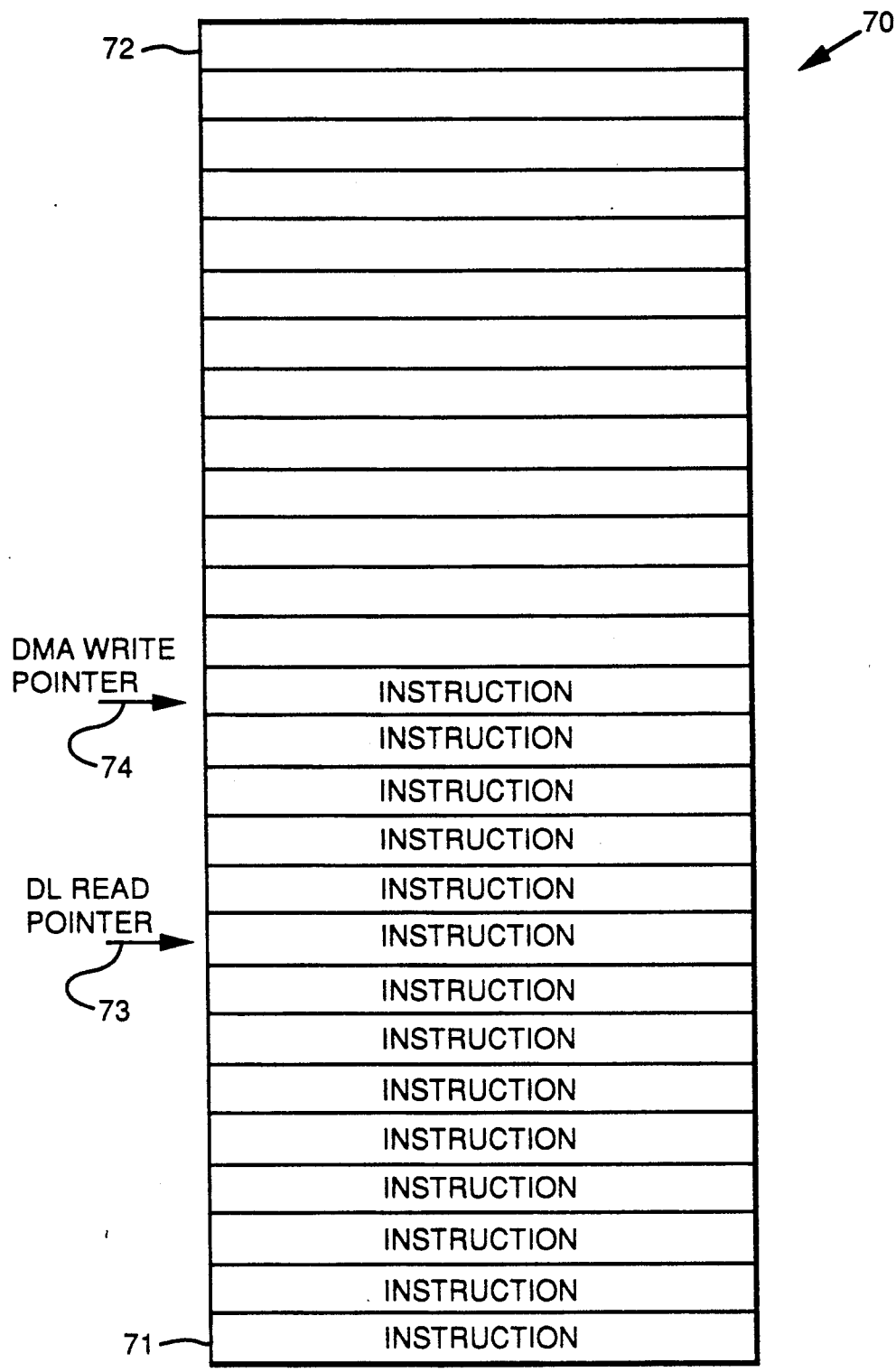
FIG. 6 is a memory map representation of a single display list showing concurrent operation.

Referring now to FIG. 6, concurrent DMA processing of a display list is illustrated. A display list 70 is loaded into the display list region of the display memory 26 starting from the start address 71 and proceeding through the last address of the display list 72 under DMA control in the concurrent DMA processing mode. As with the FIFO implementation discussed in the related patent application entitled "Multifunction High Performance Graphics Rendering Processor," a read pointer 73 and a write pointer 74 are implemented to keep track of execution and downloading operations. This implementation is different from a FIFO because the display list region of the display memory 26 is large enough so that wrap around is not needed. Also, a FIFO-type empty signal is implemented to identify when the read pointer has caught up with the write pointer 74. Graphic processing operations are temporarily disabled when the empty signal is generated, similar to the wait and hold operations in micro processors.

In the concurrent DMA mode of operation, a display list is processed concurrently with the display list being built by and downloaded from the host processor 14. This mode is implemented by controlling display list processing in response to pointer separation. As long as the write pointer 74 is ahead of the read pointer 73, processing of the display list is enabled. When the write pointer 74 is at the same address as the read pointer 73, processing of the display list is disabled. This is because, when the write pointer 74 is at the same address as the read pointer 73, the read pointer 73 has caught up with the write pointer 74 and hence the region of the display list that has been written into the under control of the write pointer 74 has already been accessed and processed under control of the read pointer 73. Then, processing is disabled until an additional instruction is loaded into the display list, thereby advancing the write pointer 74 past the read pointer 73 and enabling the processing until the read pointer 73 again catches up with the write pointer 74. This operation allows a host processor 14 to build and download a display list while the graphics processor 10 follows along behind and processes the region of the display list that has been down loaded.

The concurrent DMA processing capability reduces the latency time between the building and downloading of a display list and the processing of a display list. In accordance with this feature, it is not necessary for the graphics cogenerator 10 to wait for completion of building and downloading of the display list. In the present embodiment where the graphics cogenerator 10 is fast enough, the instructions in the display list can be executed by the graphics cogenerator 10 as fast as they are generated by the host computer 14. This results in the display list being completely processed by the graphics cogenerator 10 substantially simultaneously with the display list being completely downloaded by the host processor 14.

To initiate DMA processing, a START DMA PROCESSING instruction is down loaded from the host processor 14. This instruction places the graphics cogenerator 10 into the concurrent DMA processing mode. In this mode, processing is disabled when a partially processed display list becomes empty. Otherwise, processing of a display list in the concurrent DMA processing mode is the same as processing of a display list in the normal (non-DMA) mode.

The START DMA PROCESSING instruction includes the DMA write pointer address 71 defining where in the display list region concurrent DMA processing is to start. The DMA read pointer 73 and the DMA write pointer 74 are both set to the address defined by the START DMA PROCESSING instruction. A routine of display list instructions 500 follows the START DMA PROCESSING instruction. This is generated by downloading instructions from the host processor 14 to the graphics cogenerator 10 through a DMA port. This DMA port is implemented with a reserved write address on the bus 18 that is supported by the graphics cogenerator 10. Each time an instruction is downloaded in the DMA mode, the graphics cogenerator 10 loads it into the display list region at the current location of the DMA write pointer 73 and then increments the DMA write pointer 74. Each time an instruction is executed in the DMA mode, the graphics cogenerator 10 increments the DMA read pointer 74. The graphics cogenerator 10 processes instructions from the display list as long as the DMA read pointer 73 is not equal to the DMA write pointer. This allows the graphics cogenerator 10 to process the display list as it is being built. This feature significantly reduces the latency time compared to the conventional implementation of waiting until a display list is completely downloaded before commencing display list processing.

The following description shows how the graphics cogenerator 10 performs concurrent DMA processing. The host processor 14 first loads a pointer value over the bus 18. The graphics cogenerator 10 detects the write cycle at the reserved address from the host processor 14 and loads the pointer into the DMA write pointer register and into the DMA read pointer register. Next, the host processor 14 builds and downloads a display list that is loaded under DMA control of the write pointer into the display list region 70 of the display memory 26. The host processor 14 builds and downloads the display list that is to be DMA loaded and concurrently executed in the same manner that it builds and downloads display lists that are to be executed in a non-concurrent manner except that the display list to be DMA loaded is downloaded to a reserved address port called the DMA data port. The START DMA PROCESSING instruction is downloaded to the higher priority FIFO before the display list is completely downloaded. This instruction is similar to a CALL instruction.

Many alternative embodiments may be implemented from the teachings herein. For example, the display list may be implemented with dedicated memory in place of the shared display memory 26. Also, the graphics cogenerator 10 may be implemented with a single LSI integrated circuit chip or with MSI and LSI integrated circuits mounted on printed circuit boards. Also, various portions of the system may be implemented with a micro processor, such as a Motorola 68040 or an AMD 29000, programmed to perform the system operations. Also, the graphics system may be implemented for example by a stored program processor or by a special purpose hardwired processor. Stored program processors may be implemented for example by microprocessors, by array processors, or by RISC processors.

Thus there had been described a new and improved graphic display system and method. It is to be understood that the above-described embodiments are illustrative of some of the many specific embodiments that represent applications of the principles of the present invention. Clearly, numerous and varied other arrangements may be designed by those skilled in the art without departing from the scope of the invention.

What is claimed is:

1. A display system for comprising:
    a graphics processor for generating graphic pixel signals in response to display lists;
    at least one stored program computer for generating a plurality of display lists, each display list including a plurality of graphic instructions, said plurality of display lists including high priority display lists requiring nearly immediate transfer of said plurality of graphical instructions to said graphics processor and low priority display lists requiring less nearly immediate transfer of said plurality of graphical instructions to said graphics processor;
    a high priority hardware channel and a low priority hardware channel for providing said high priority display lists and said low priority display lists, respectively from said at least one stored program computer to said graphics processor;
    First In First Out (FIFO) controller means coupled to said high priority hardware channel and said low priority hardware channel for receiving and storing said high priority and low priority display lists and coupling said display lists to said graphics processor; and
    a display list processing means, said display list processing means receiving said high and low priority display lists from said FIFO controller means, said display list processor including means for processing said high priority display lists before said low priority display lists, said plurality of instructions being received sequentially, said display list processing means having means for concurrently transferring earlier-received instructions of said plurality of instructions of a display list to the graphics processor at the same time that said display list processing means is receiving additional received instructions of said display list from said FIFO controller means.

2. A display system as recited in claim 1 wherein said FIFO controller means provides a FIFO-empty signal when a display list that is being coupled to said display list processing means is empty and wherein said display list processing means includes means for disabling the processing of the display list upon receipt of said FIFO-empty signal.

3. A display system as set forth in claim 1, wherein the graphics processor includes:
    an interrupt input circuit for generating an interrupt signal and
    an interrupt execution circuit coupled to the interrupt input circuit for interrupting the generating of graphic pixel signals by the graphics processor in response to the interrupt signal.

4. A display system as set forth in claim 3, wherein the graphics processor further includes a nested subroutine circuit for concurrently processing the instructions in the display list as nested subroutines.

5. A display system as set forth in claim 1, wherein the graphics processor includes:
    an interrupt input circuit for generating an interrupt signal;
    an interrupt execution circuit coupled to the interrupt input circuit and to the plurality of FIFOs for interrupting the generating of graphic pixel signals in response to the interrupt signal and in response to a first display list stored by the plurality of FIFOs and for generating graphic pixel signals in response to the interrupt signal and in response to a second display list stored by the plurality of FIFOs; and a context memory coupled to the interrupt input circuit for storing the context of the first display list in response to the interrupt signal.

6. A display system as set forth in claim 1, further comprising:

an interrupt input circuit for generating an interrupt signal;

a nested interrupt execution circuit coupled to the interrupt input circuit and to the stored program computer for interrupting the generating of graphic pixel signals in response to the interrupt signal and for generating the graphic pixel signals in response to the interrupt signal; and a push down stack coupled to the interrupt input circuit for storing a plurality of return addresses related to nested interrupts.

7. A display system as set forth in claim 1, wherein the graphics processor further includes:

a nested subroutine execution circuit for generating the graphic pixel signals under control of a nested subroutine instruction;

a push down stack coupled to the nested subroutine execution circuit for storing a plurality of return addresses related to nested subroutines.

8. A display system as set forth in claim 1, further comprising:

an interrupt input circuit for generating an interrupt signal;

a nested interrupt execution circuit coupled to the interrupt input circuit for interrupting the generating of graphic pixel signals in response to the interrupt signal and for generating the graphic pixel signals in response to the interrupt signal;

a push down stack coupled to the interrupt input circuit for storing a plurality of return addresses related to nested interrupts;

a restore control circuit coupled to the nested interrupt execution circuit for generating a plurality of nested restore signals in response to the graphic instructions in the display list; and a restore execution circuit coupled to the restore control circuit and to the push down stack for restoring the return addresses in response to the plurality of nested restore signals.

9. A display system as set forth in claim 1 wherein the graphics processor further includes:

a nested subroutine execution circuit for generating the graphic pixel signals in response to a nested subroutine instruction;

a push down stack for storing a plurality of return addresses related to nested subroutines;

a restore control circuit coupled to the nested subroutine execution circuit for generating a plurality of nested restore signals in response to the graphic instructions in the display list; and a restore execution circuit coupled to the restore control circuit and to the push down stack for restoring the return addresses in response to the plurality of nested restore signals.

* * * * *